United States Patent [19]

Hashida et al.

[11] Patent Number: 4,861,409
[45] Date of Patent: Aug. 29, 1989

[54] PROCESS AND APPARATUS FOR FORMING LAMINATE BY THERMOCOMPRESSION BONDING

[75] Inventors: Kenji Hashida, Kyoto; Takeshi Yamamoto, Shiga; Tatsuya Fukumoto; Tetsuji Deguchi, both of Kyoto; Shigeyuki Hirata; Osamu Uehara, both of Kyoto; Kazuhiko Akebi, Kyoto, all of Japan

[73] Assignee: Gunze Kabushiki Kaisha, Ayabe, Japan

[21] Appl. No.: 130,114

[22] PCT Filed: Mar. 11, 1987

[86] PCT No.: PCT/JP87/00155
§ 371 Date: Oct. 30, 1987
§ 102(e) Date: Oct. 30, 1987

[87] PCT Pub. No.: WO87/05560
PCT Pub. Date: Sep. 24, 1987

[30] Foreign Application Priority Data
Mar. 18, 1986 [JP] Japan .................................. 61-61722

[51] Int. Cl.[4] .............................................. B32B 31/20

[52] U.S. Cl. ...................................... 156/308.2; 100/45; 100/173; 156/182; 156/324; 156/324.4; 156/361; 156/555; 364/473; 364/476

[58] Field of Search ............... 156/324.4, 308.2, 182, 156/361, 324, 555; 100/45, 173; 364/473, 476

[56] References Cited

U.S. PATENT DOCUMENTS 3,654,020  4/1972  Robinson ........................... 156/324

Primary Examiner—John J. Gallagher
Attorney, Agent, or Firm—Sixbey, Friedman, Leedom & Ferguson

[57] ABSTRACT

The invention provides a process and an apparatus for laminating a film 1 and a film 2 by thermocompression bonding.

When the film 1 and the film 2 are laminated by thermocompressing bonding with a heat roll 3 and a pressure roll 4, the film 1 is guided onto the heat roll 3 via a feed angle adjusting roll 5 for automatically adjusting the distance of contact of the film with the heat roll 3, and/or the laminate film formed by thermocompression bonding is released from the heat roll 3 by being passed over a discharge angle adjusting roll 8 for automatically adjusting the distance of contact of the laminate film with the heat roll.

18 Claims, 5 Drawing Sheets

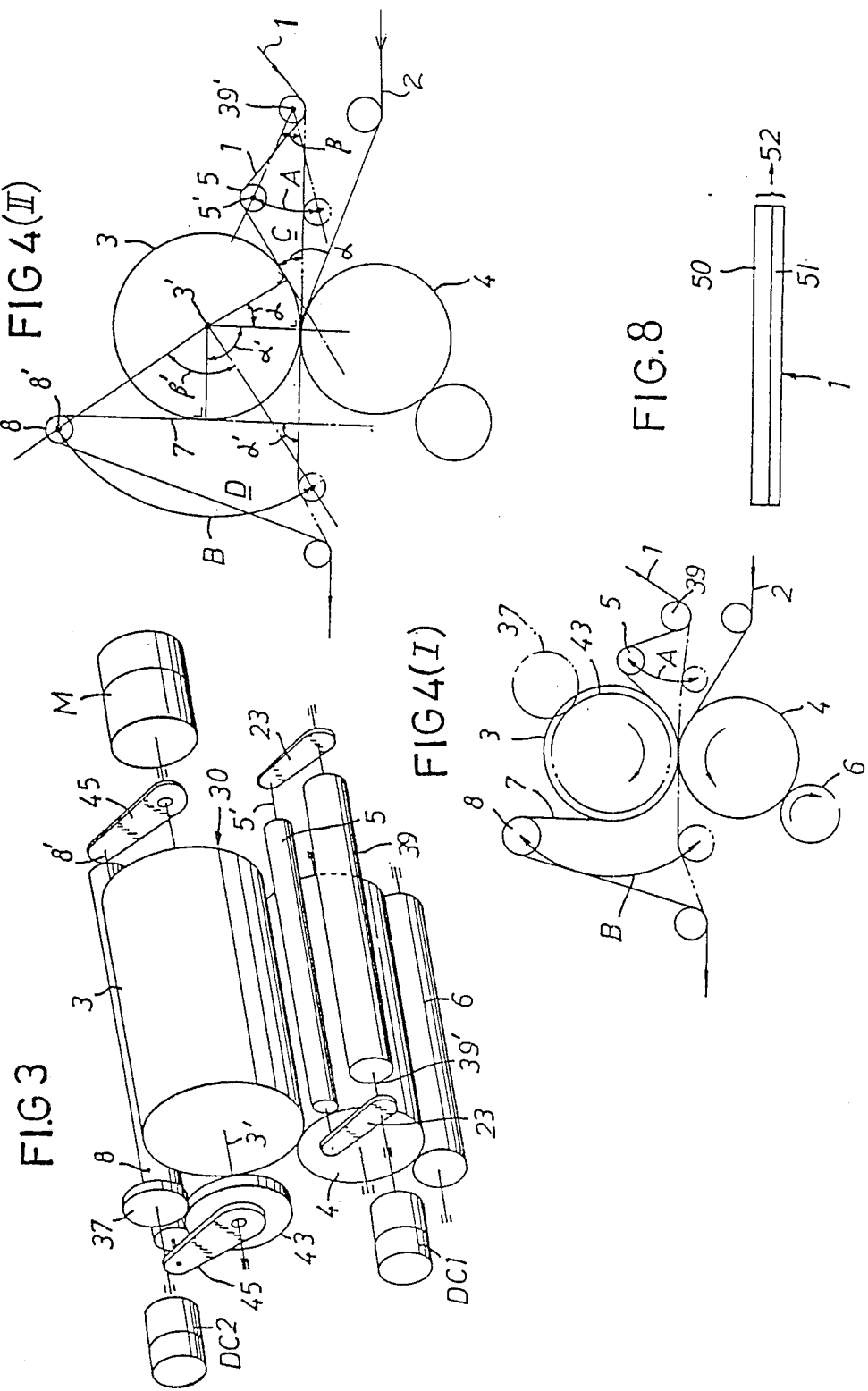

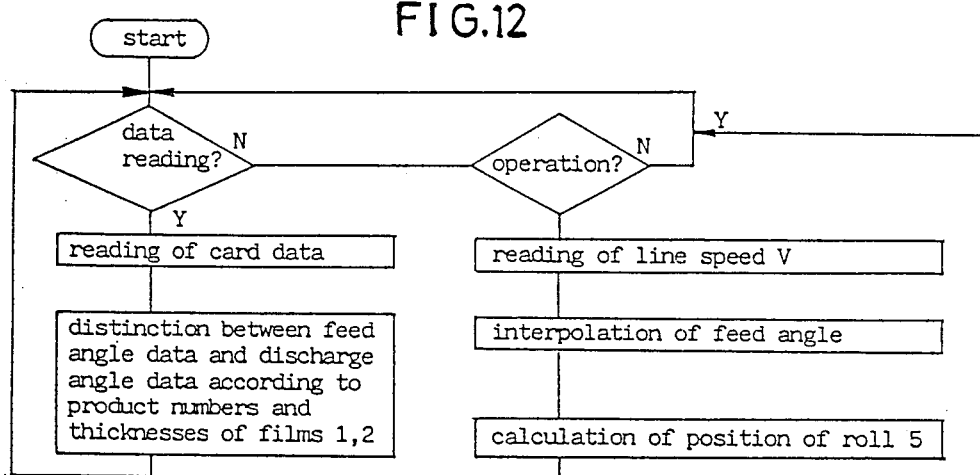
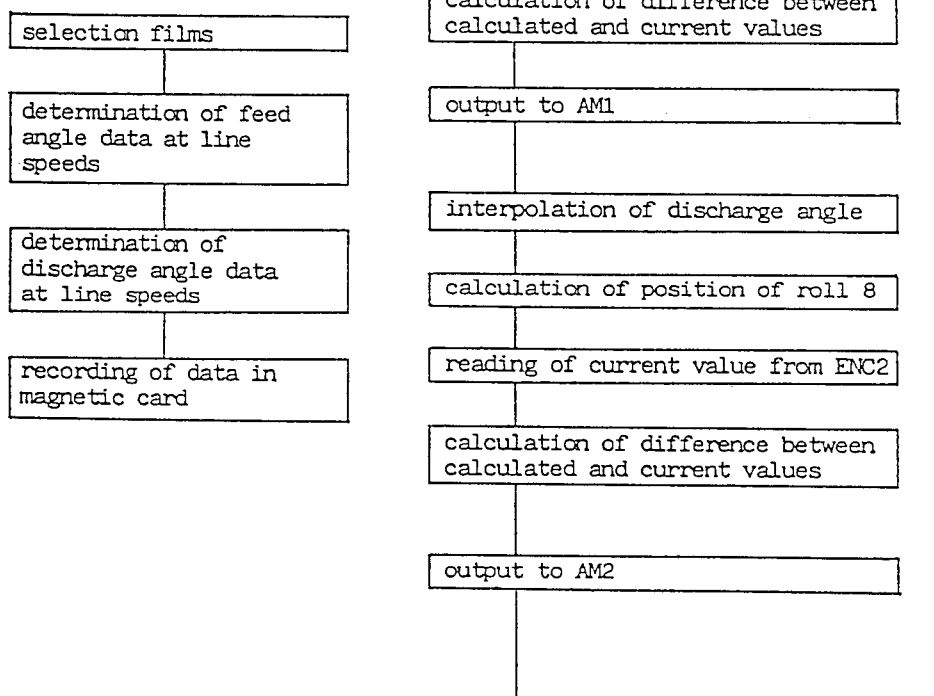

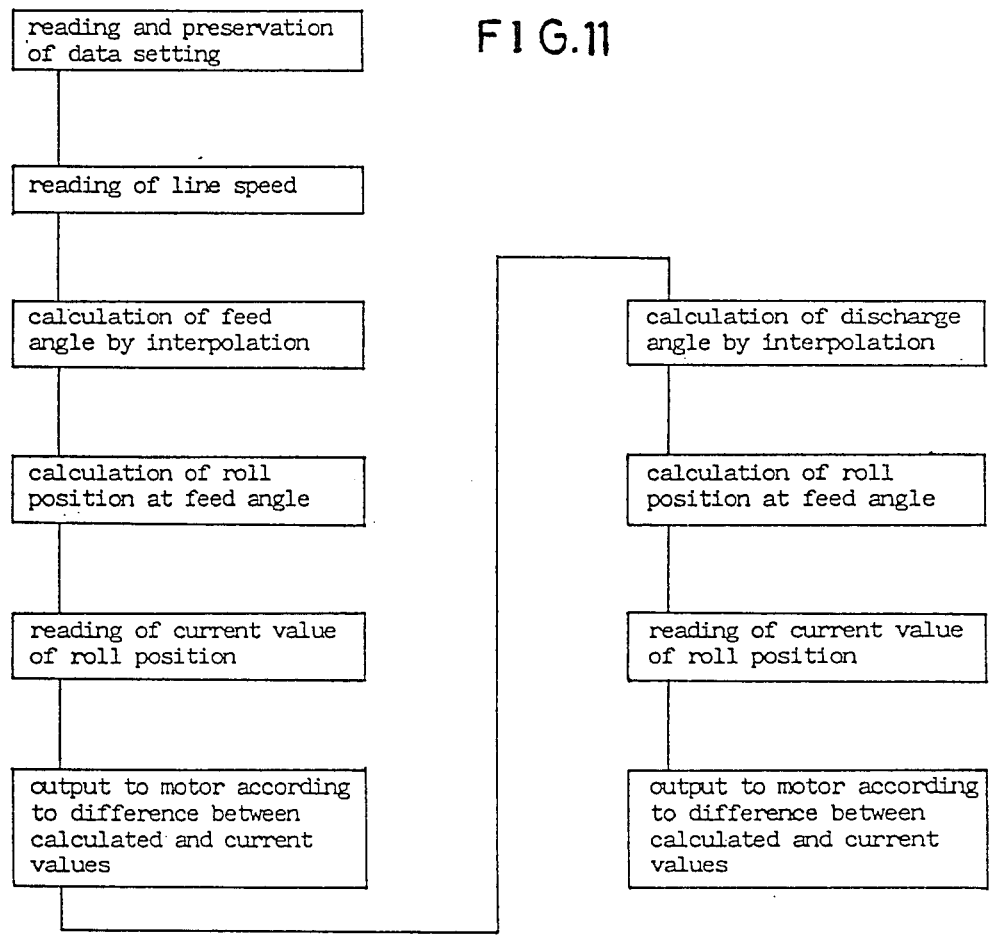

PROCESS AND APPARATUS FOR FORMING LAMINATE BY THERMOCOMPRESSION BONDING

TECHNICAL FIELD

The present invention relates to a process suitable for laminating a film to a film by thermocompression bonding and an apparatus for practicing this process.

BACKGROUND ART

While processes are known for laminating a film to a film by thermocompression bonding, the dry lamination process is most generally used in which films are bonded together by thermocompression with application of an adhesive. However, this process has problems since an organic solvent is used for the application of the adhesive. The solvent residue poses a hygienic problem, the drying step needed increases the number of steps, the need to vaporize the solvent for drying entails an increased cost, and the air pollution due to the resulting gas is not negligible. With the extrusion lamination process which is practiced as an alternative to the above process, a molten resin film is extruded onto a film directly or with an anchor coat layer interposed therebetween to form a laminate.

The latter process nevertheless has drawbacks. The apparatus is large-sized and costly, variations in the quality of the product present difficulties in quality control, and the extrusion temperature, which is generally high, permits release of odor due to oxidation and is liable to result in impaired heat sealability. Moreover, when the apparatus is started up for producing a small amount of laminate, a very great loss occurs.

In view of the above situation, we have already succeeded in developing a laminate film producing process which uses no solvent, is highly amenable to small-quantity production, can be practiced by a small apparatus at a low equipment cost and affords a product of uniform quality as proposed in Unexamined Japanese Patent Publications Nos. SHO 56-77116, SHO 56-109726, SHO 57-47624, etc. Whereas the conventional dry lamination process employs a liquid or semi-solid adhesive of low viscosity, therefore uses relatively low temperature and pressure for thermocompression bonding and can be practiced by a usual dry laminator free of problems, the process of Unexamined Japanese Patent Publication No. SHO 56-77116, etc., wherein solid films are bonded into a laminate by thermocompression, requires relatively high temperature and high pressure and therefore encounters problems when practiced by the conventional dry laminator for use with an adhesive.

Stated more specifically, problems arise if a laminate film is produced using the conventional dry laminator of the adhesive application type wherein members are fixedly provided in front and rear of its thermocompression unit. For example, when the film feed angle, the laminate film discharge angle, the temperature of the heat roll and the pressure for thermocompression, etc. are set to values which are optimum for a high production speed which is the usual speed of lamination, the laminate film obtained will be creased or clouded owing to excessive heating when the apparatus is at a low speed immediately after start-up or immediately before stopping. Conversely, if these values are so set as to be optimum when the apparatus operates at a low speed immediately after start-up or immediately before stopping, the amount of heat given to the films will be insufficient during a high-speed operation, failing to impart sufficient bond strength to the resulting laminate film. Thus, the laminator is unable to operate satisfactorily in accordance with variations in the production speed.

The object of the present invention is to overcome the foregoing drawbacks of the prior art and to provide a process for laminating films into a laminate free of creasing and clouding and having uniform and sufficient strength, and an apparatus for practicing the process.

DISCLOSURE OF THE INVENTION

The present invention provides a lamination process for laminating a film 1 and a film 2 by thermocompression bonding using a nipping roll unit 30 comprising a heat roll 3 and a pressure roll 4, the process being characterized by subjecting the films to thermocompression bonding by guiding the film 1 onto the heat roll 3 while guiding the other film 2 onto the pressure roll 4 to obtain a laminate film 7, and subsequently releasing the laminate film 7 from the heat roll 3 by passing the laminate film over a discharge angle adjusting roll 8 for automatically adjusting the distance of contact of the laminate film 7 with the heat roll 3, the invention also providing an apparatus for this process. The laminate film obtained by the process and the apparatus is free of creasing and less prone to clouding and has uniform and sufficient bond strength, so that the product available has an excellent quality. Especially because the laminate film obtained by thermocompression bonding with the nipping roll unit is released from the heat roll by way of the discharge angle adjusting roll for automatically adjusting the distance of contact of the film with the heat roll, a constant amount of heat can be always given to the laminate film on lamination even when the lamination speed varies. This makes it possible to provide a uniform product which is free from variations in quality.

Further the present invention provides a process for laminating a film 1 and a film 2 by thermocompression bonding using a nipping roll unit 30 comprising a heat roll 3 and a pressure roll 4, the process being characterized by subjecting the films to thermocompression bonding by guiding the film 1 onto the heat roll 3 via an automatic feed angle adjusting roll 5 for adjusting the distance of contact of the film 1 with the heat roll 3 while guiding the other film 2 onto the pressure roll 4, and releasing the resulting laminate film 7 from the heat roll 3, the invention also providing an apparatus for this process. The laminate film obtained by the process and the apparatus is free of creasing and less prone to clouding and has uniform and sufficient bond strength, so that the product available has an excellent quality. Especially because the film 1 to be subjected to thermocompression bonding by the nipping roll unit is guided onto the heat roll via the feed angle adjusting roll for automatically adjusting the distance of contact of the film with the heat roll, a constant amount of heat can always be given to the film 1 immediately before lamination. This makes it possible to provide a uniform product which is free from variations in quality.

When the above processes, as well as the above apparatus, are combined, the foregoing advantages are combined to provide a more excellent product.

BRIEF DESCRIPTION OF THE DRAWINGS

FIGS. 1 to 4 show an embodiment of apparatus for practicing the process of the invention, FIG. 1 being a perspective view showing the appearance of the apparatus, FIG. 2 being a front view of the same, FIG. 3 being a perspective view showing a nipping roller unit for thermocompression bonding, and FIG. 4 being side views of the same;

FIGS. 5 and 6 are block diagrams showing processes for controlling a feed angle adjusting roll and a discharge angle adjusting roll included in the apparatus;

FIG. 7 is a fragmentary diagram illustrating an exemplary feed angle adjusting roll arrangement;

FIG. 8 is a sectional view showing an example of film 1 for use in the invention;

FIG. 10 is a block diagram showing a method of preparing data as to the feed angle and the discharge angle;

FIG. 11 is a block diagram showing the operation of the mechanical apparatus; and FIG. 12 is a flow chart showing the same.

BEST MODE OF CARRYING OUT THE INVENTION

Figure 1:
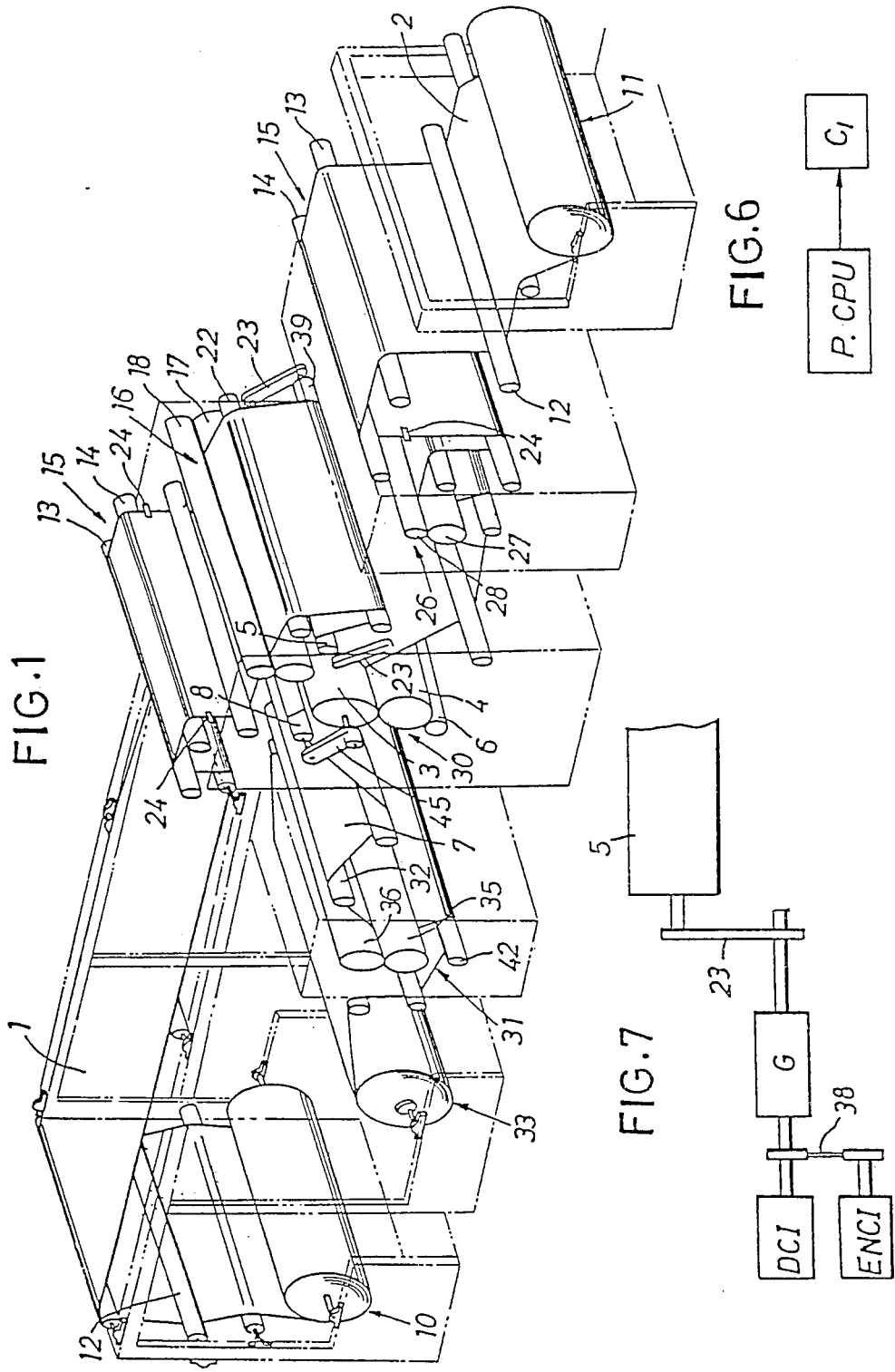
Figure 2:
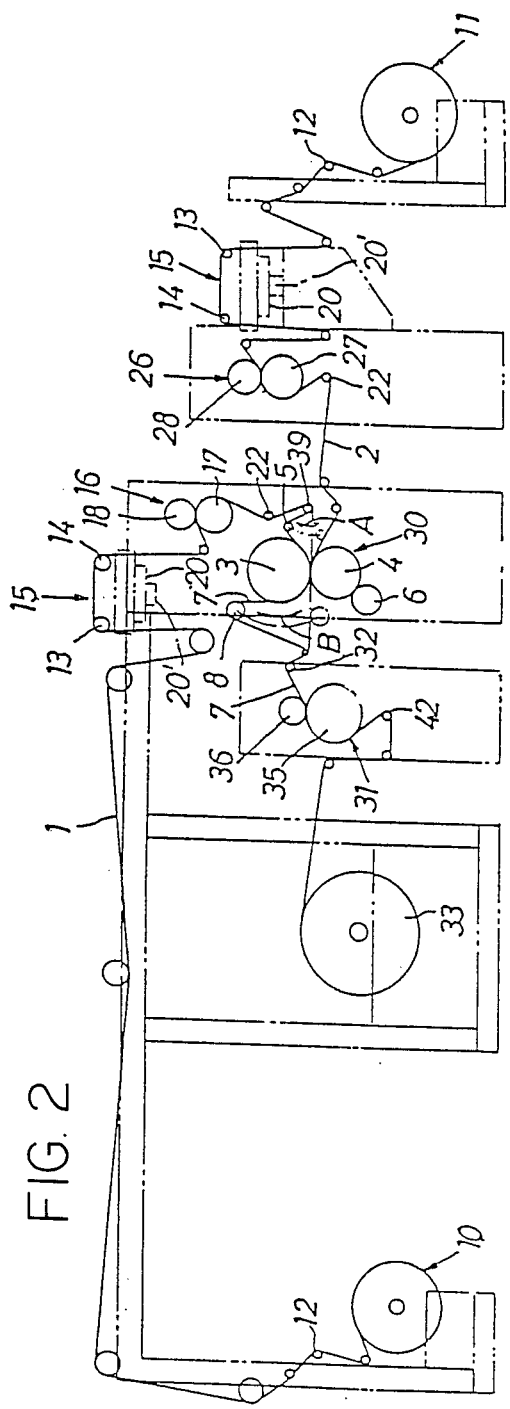

Embodiments of the present invention will be described below with reference to the drawings. FIG. 1 is a perspective view showing the overall appearance of a preferred embodiment of apparatus for practicing the process of the invention, and FIG. 2 is a front view of the same. The frame of the apparatus is indicated in broken lines in the drawings. A pay-off unit 10 for a film 1 is disposed at the left end of the frame, and a pay-off unit 11 for a film 2 at the right end thereof. The films 1, 2 are guided toward the center of the frame. Tension sensors 12 and edge controllers 15 are arranged away from the pay-off units 10, 11 toward the center of the frame. The pay-off units 10, 11 are rotatable by the films 1, 2. When the tension on the film decreases to below a set value, the tension sensor 12 operates to apply a brake for the pay-off unit 10 (11), whereas if the tension exceeds a set value, the sensor 12 operates to release the brake, whereby the paying-off tension is adjusted. The edge controller 15 comprises two idle rolls 13, 14 rotatably arranged in parallel to the payoff unit 10 (11), and a support 20 for supporting the rolls 13, 14 thereon. The support 20 is rotatable clockwise and counterclockwise about a support pivot 20' provided centrally thereof. The edge controller 15 is controlled by sensor members 24, 24 which are, for example, photocells attached to the frame. Thus, the sensor members 24, 24 detect a deflection of the edges of the film 1 (2), whereupon the idle rolls 13, 14 are rotated about the pivot 20' in a direction to remedy the deflection, causing the film to advance in the proper direction.

Indicated at 16, 26 are preheating nipping roller units disposed downstream from the edge controllers 15, 15 with respect to the direction of advance of the film. The unit 16 (26) comprises a heat roll 17 (27) and a pressure roll 18 (28) for preheating the film 1 (2), which is then passed over a tension sensor 22. The film 1 is then guided onto a heat roll 3 of a thermocompression bonding nipping roll unit 30 via a feed angle adjusting roll 5. According to the present embodiment, the line speed V is equal to the peripheral speed of the heat roll 3. The tension sensor 22 (22) gives an instruction to the heat roll 17 (27) of the preheating nipping roll unit 16 (26) to adjust the peripheral speed of the roll 16 (26) according to the tension detected. The feed angle adjusting roll 5 controls the distance of contact of the film 1 with the heat roll 3 when the film 1 is to be fed to the heat roll 3. The roll 5 is automatically adjustingly movable along a circular-arc path as indicated by an arrow A so as to adjust the film 1 to an optimum feed angle, i.e. to cause the film 1 to contact the heat roll 3 over an optimum distance, in accordance with the peripheral speed of the heat roll 3. On the other hand, the film 2 is guided onto a pressure roll 4, whereupon the nipping roll unit 30 bonds the films 1, 2 into a laminate film 7 by thermocompression. With the present invention, the material sent out from the nip of the nipping roll unit 30 is thus called the "laminate film 7," and the materials to be fed to the nip are referred to as the "film 1" and the "film 2." It is advantageous to feed the film 2 to the pressure roll 4 as passed around the roll surface over some distance in contact therewith so as not to entrap air. The pressure roll 4 of the roll unit 30 is provided with cooling means 6, such as a cooling roll, in contact therewith for minimizing the rise of the temperature of the pressure roll 4 due to heat transfer from the heat roll 3, whereby the laminate 7 is prevented from creasing or clouding.

A discharge angle adjusting roll 8 is disposed at the outlet side of the nipping roll unit 30 for automatically adjusting the distance of contact of the bonded films, i.e. the laminate film 7, with the heat roll 3. Thus, the laminate film is released from the heat roll 3 by being passed over the roll 8. The position of the roll 8 is automatically adjusted as indicated by an arrow B so as to release the laminate film 7 from the heat roll 3 at an optimum angle, i.e. to cause the film 7 to contact the roll 3 over an optimum distance before releasing, in accordance with the line speed V, i.e. with the peripheral speed of the heat roll 8 in the case of the present embodiment, as shown in detail in FIG. 4 (I). With reference to FIG. 4 (II), the distance of contact of the film 1 with the heat roll 3 is the distance on the roll periphery over which the film 1 is in contact with the roll 3 and which subtends an angle $\alpha$, while the contact distance of the laminate film 7 is the distance on the roll periphery over which the film 7 is in contact with the roll 3 and which subtends an angle $\alpha'$, the angles being at the center of the roll 3. The contact distance of zero refers to the position of the point of contact between the heat roll 3 and the pressure roll 4 at the nip. At this time, the angles $\alpha$ and $\alpha'$ about the center of the roll 3 are of course 0. Generally, however, the film 1 is fed to the heat roll 3 tangentially thereof, while the laminate film 7 is released from the roll 3 tangentially thereof. Consequently, the tangent line of feed of the film 1 intersects a tangent line at the point of contact between the rolls 3 and 4 at the nip, and the angle between the two lines at the feed side C, i.e. the feed angle, is also $\alpha$. Similarly, the tangent line of discharge of the laminate film 7 intersects the tangent line at the contact point of the nip, and the angle between the two lines at the discharge side D, i.e. the discharge angle, is also $\alpha''$. While the contact point of the nip is positioned immediately below the center of the heat roll 3 as illustrated, any point on the circumference of the heat roll 3 can be similarly positioned. The nipping rolls have been described above with reference to FIG. 4 (II) as an ideal case.

Further arranged along the path of advance of the film 7 downstream from the discharge angle adjusting roll 8 are a tension sensor 32, a cooling nipping roll unit 31, a tension sensor 42 and a take-up unit 33. The laminate film 7 forwarded from the adjusting roll 8 is fed via the tension sensor 32 to the cooling roll unit 31, passed over the tension sensor 42 and rolled up by the take-up unit 33. The cooling roll unit 31 comprises a cooling roll 35 and a pressure unit 36. The sensor 32 gives an instruction to the cooling roll 35 of the unit 31, while the sensor 42 delivers an instruction to a prime mover for the take-up unit 33 to effect control.

While electromagnetic brakes are used for controlling the pay-off units 10, 11 for the adjustment of tension, the construction of the pay-off units 10, 11 and control means therefor are not limited to those of the foregoing embodiment. The tension sensors 12, 22, 32 and 42 can be dancer rolls, accumulators or any other desired means for detecting the tension. With the present embodiment, known means is used which comprises a roller for giving an instruction to the required member upon converting the movement of the roller due to a variation in the tension to a voltage, current or the like for the detection of the variation. Such tension sensors are of course provided as required. The controller for the edge of the film 1 or 2 is of course provided as desired. The controller can be some means other than the controller of the embodiment. Further with the present embodiment, the film is preheated by the preheating nipping roll unit 16 (26) with the tension thereon delicately adjusted by the tension sensor 22, while the nipping engagement achieves an improved preheating efficiency. Alternatively, the film may be passed through a heating zone or wound around a heat roll for preheating. The take-up unit may have a suitable construction.

The construction of the foregoing embodiment will be described in greater detail with reference to FIGS. 3 to 8. FIG. 3 is a perspective view showing the nipping roll unit 30 for thermocompression bonding, and FIG. 4 presents side views showing the same.

The illustrated feed angle adjusting roll 5 need not always be provided depending on the materials of the films, line speed, etc. A fixed feed angle roll which is not adapted for angular adjustment may be used in some case.

The feed angle adjusting roll 5 may be moved manually or automatically to suitably adjust the distance of contact of the film 1 with the heat roll 3. While any of various mechanisms operable in accordance with the line speed is usable for automatic adjustment, it is preferable to use a computer for making automatic adjustment by the following method. Arms 23, 23 are fixed to the shaft 39′ of an idle roll 39 and carry at their forward ends a shaft 5′ supporting the angle adjusting roll 5 in parallel to the roll 39 so as to render the roll 5 movable about the axis of the idle roll 39 along a circular-arc path. The shaft 39′ is provided at its one end with a d.c. servomotor DC1, whereby the arms 23, 23 are moved to thereby position the roll 5 as desired for automatically adjusting the distance of contact of the film 1 with the heat roll 3.

Since the desired angle α of the film 1 to be fed to the heat roll 3 varies with the line speed V, i.e. the peripheral speed of the heat roll 3, it is desirable to magnetically prerecord positions of the roll 5 permitting the film to contact the heat roll over a preferable distance at varying peripheral speeds of the heat roll, read out the recorded data as to the position of the roll 5 for a particular peripheral speed of the heat roll 3 and control the position of the roll 5 according to the data by the motor for thermocompression bonding. For magnetically recording the position of the roll 5, the feed angle α of the film relative to the heat roll 3 may typically be used or other characteristics may be used. A floppy disk, magnetic card or some other suitable means is usable for the magnetic recording. The motor can be a d.c. servomotor, a.c. servomotor, d.c. motor, stepping motor or the like. A d.c. servomotor is used in the present embodiment as already mentioned.

The use of the feed angle adjusting roll 5 results in the advantage of reducing the likelihood that excessively preheating will crease or cloud the laminate film or insufficient preheating will give insufficient bond strength to the laminate film since the film 1 can be set to the desired feed angle despite variations in the line speed. This advantage becomes more remarkable especially when the distance of contact with the heat roll 3 is made automatically adjustable.

The heat roll 3 of the roll unit 30 for the film 1 is made of metal, and the pressure roll 4 for the film 2 is provided with cooling means, which is the cooling roll 6 according to the present embodiment. The cooling roll 6 prevents the rise of the temperature of the pressure roll 4. Instead of the roll 6, a cooling air duct, air knife or like cooling means or some other suitable means is usable, insofar as such means prevents the temperature of the pressure roll 4 from rising. The cooling means is provided for the purpose of preventing the laminate film 7 from creasing or clouding. The temperature of the pressure roll 4, if rising markedly, changes the crystallinity or the like of the film, presumably rendering the film prone to clouding, and also makes the delicate control system susceptible to errors. Although not essential to the present invention, the provision of the cooling means is desirable as described above, while depending on the materials of the films or line speed, the cooling means can be dispensed with.

The discharge angle adjusting roll 8 needs only to be such that it is capable of automatically adjusting the distance of contact of the laminate film 7 with the heat roll 3 upon thermocompression bonding. Generally any of various mechanisms is satisfactorily usable provided that they operate as related with the line speed. Preferably, the contact distance is automatically adjusted by a computer by the following method. The heat roll 3 is supported by a shaft 3′ and driven by a motor M provided at one end of the shaft 3′. Arms 45, 45 are idly rotatably supported by the shaft 3′ at opposite sides of the heat roll 3. The adjusting roll 8 is freely rotatably supported by the free ends of the arms 45, 45 and is parallel to the heat roll 3. A gear 43 integral with one of the arms 45 is freely rotatably mounted on the shaft 3′ and is in mesh with a gear 37 which is drivingly rotated by a d.c. servomotor DC2. Accordingly, the discharge angle adjusting roll 8 can be positioned as desired by the d.c. motor DC2 via the gears 37, 43 and arm 45, whereby the distance of contact with the heat roll 3 can be adjusted automatically. Since the desired discharge angle α″ at which the laminate film 7 is released from the heat roll 3 varies with the line speed V, i.e. the peripheral speed of the heat roll 3, it is suitable to magnetically prerecord positions of the roll 8 which permit the film 7 to contact the heat roll 3 over a preferable distance at varying peripheral speeds of the heat roll, to read out the recorded data as to the position of the roll 8 for a particular peripheral speed of the heat roll 3 upon thermocompression bonding and to control the position of the roll 8 according to the data by the motor. For magnetically recording the position of the roll 8, the discharge angle $\alpha'$ of the laminate film 8 relative to the heat roll 3 may typically be used, or other characteristics may be used. A floppy disk, magnetic card or some other suitable means is usable for the magnetic recording. Examples of useful motors are a d.c. servomotor, a.c. servomotor, d.c. motor, stepping motor and the like. A d.c. servomotor is used in the present embodiment as already mentioned. The use of the discharge angle adjusting roll 8 obviates the likelihood that excessive heating will crease or cloud the laminate film 7 or insufficient heating will give insufficient bond strength to the laminate film 7 since the discharge position can be automatically adjusted as desired.

Cooling water is passed through the discharge angle adjusting roll 8 to rapidly cool the laminate film 7 and thereby preclude the film 7 from creasing or clouding. The cooling means may be used as desired depending on the materials of the component films, the speed, etc., while some other cooling means is usable, such as a cooling air duct, air knife or the like. Such means may be provided separately from the roll 8 in the closest proximity to the heat roll 3.

According to the present embodiment, the cooling nipping roll unit 31 is used for cooling the laminate film 7 before it is rolled up by the take-up unit 33. The roll unit 31 comprises a water-cooled metal roll 35 and a pressure roll 36. However, the cooling means is not limited to the unit 31 in this invention; a simple cooling roll may be used for passing the film thereover, or means for applying cold air is of course usable. The film need not be cooled if cooling is unnecessary.

The rolls illustrated without any reference numeral are guide rolls, which are provided as required. These rolls and the pressure rolls 18, 28, 4, 36 of the preheating units 16, 26, the thermocompression bonding unit 30 and the cooling unit 31 already described are preferably rubber rolls which are made, for example, of synthetic rubber, high-pressure rubber, silicone rubber, fluoroelastomer or the like, with or without a covering of fluorocarbon resin or like non-tacky substance formed over the roll. The preheating heat rolls 17, 27 and the heat roll 3 are, for example, mirror-finished metal rolls. The heating means may be steam, electric heater, hot fluid or the like.

With the present emboidment, d.c. motors are used for all the preheating heat rolls 17, 27, heat roll 3, cooling roll 35, take-up unit 33 and edge controllers 15.

According to the present embodiment, the nipping roll unit 30 for thermocompression bonding is set to a temperature and a pressure desirable in view of the properties of the films, etc. Generally, the temperature is at least 50° C., preferably about 80° to about 150° C., and the pressure is a line pressure of at least 5 kg/cm, preferably about 20 to about 80 kg/cm.

The preheating roll units 16, 26 are set to a temperature and a pressure desirable in view of the properties of the films, etc. and generally lower than the temperature and pressure of the thermocompression roll unit 30. The temperature is usually at least 40° C., preferably about 50° to about 100° C. The cooling roll unit 31 is usually up to 70° C., preferably up to 40° C. In brief, the temperature and pressure of these roll units are set to values which are desirable in view of the properties of the films 1, 2, thermal bonding properties thereof relative to each other, operation speed, area of contact of the film with the roll and various other factors.

Next with reference to FIGS. 5 to 7 and FIGS. 9 to 12, methods of automatically adjusting the feed angle adjusting roll 5 and the discharge angle adjusting roll 8 of the present embodiment will be described in detail for illustrative purposes.

Figure 9:
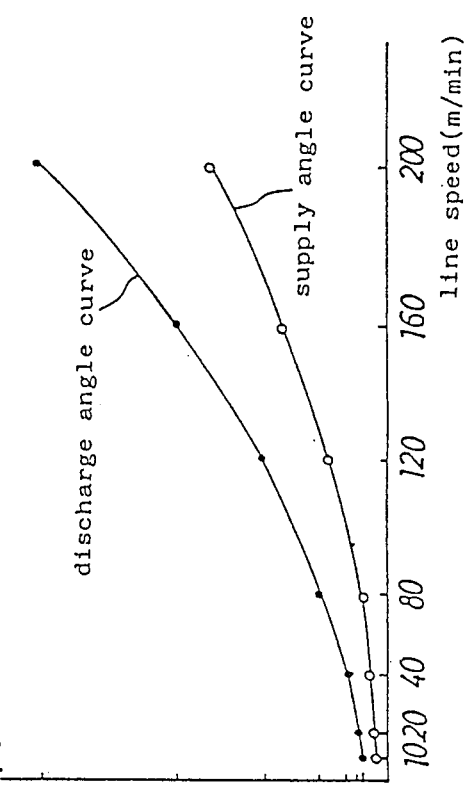
FIG. 9 shows data as to angle settings at varying line speeds for illustrating the control operation by a computer.
Figure 5:
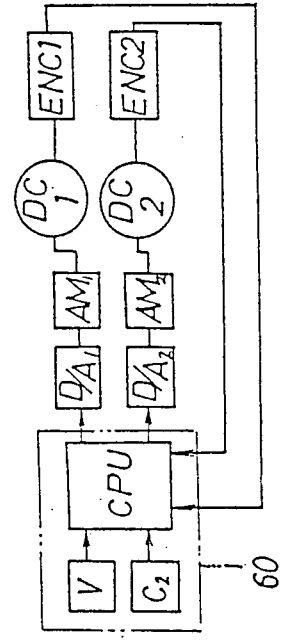

First, data is predetermined as to feed angles $\alpha$ and discharge angles $\alpha'$ which permit the film 1 and the laminate film 7 to be positioned desirably relative to the heat roll 3 at varying peripheral speeds of the line, i.e. varying peripheral speeds of the heat roll, and the items of data are entered into a personal computer P. CPU. The data items to be keyed in are the optimum angles to be set at V = 10, 20, 40, 80, 120, 160 and 200 m/min as shown in FIG. 9, and these values are entered into the computer as typical values. In actuality, these items are written and recorded in a magnetic card C by a data writing unit C1 which is provided separately.

In this procedure, the data as to the feed and discharge angles is prepared with the product numbers of the films 1, 2 (each specific to a particular product as distinguished from others in material, composition, etc.) and the thicknesses thereof considered, and the data for combinations of films 1, 2 of different product numbers and different thicknesses is recorded in magnetic cards C, each for each combination. The block diagram of FIG. 10 shows the above procedure. The positions of the rolls are controlled by the process to be described below with reference to the block diagram of FIG. 11.

The magnetic card C having the data recorded therein by the computer P. CPU is placed into a data reading unit C2 of a computer system 60 provided for controlling the rolls 5, 8 in the main body of the apparatus. The CPU reads out and preserves the predetermined data as to the feed and discharge angles $\alpha$, $\alpha'$ recorded in the card C. On the other hand, the computer system 60 reads the line speed V, i.e. the peripheral speed of the heat roll. In this way, the feed angle $\alpha$ desirable for the speed V is first determined based on the predetermined data.

The peripheral speed of the heat roll may be read directly, or some other suitable typical characteristic value may be read. Thus, the reading method is not limited specifically.

For the determination of the feed angle, desirable predetermined angles at V = 10, 20, 40, 80, 20, 160, 200 m/min are recorded as representative values in the magnetic card C as already stated. Intermediate values between these representative values are determined by proportional distribution resorting to linear interpolation. Thus, the desired feed angle at the line speed V must be corrected by calculation from time to time. For this reason, there arises a need to calculate the feed angle by interpolation. As already stated, this angle is an angle $\alpha$ at the center of roll 3 subtended by the distance on the circumference of the heat roll 3 over which the film 1 is in contact with the roll. It is necessary to calculate the position of the roll 5 giving this angle. The position of the roll 5 can be expressed in terms of the angle $\beta$ of shift of the roll 5 about the support point 39' of the arms 23. It is assumed that when the film 1 is positioned at a feed angle of 0, the roll 5 is positioned at an angle of 0. From this relation, the shift angle $\beta$ of the roll 5 at the feed angle $\alpha$ can be calculated to determine the proper position of the roll 5.

In this way, the desirable position of the roll 5 at a particular feed angle is calculated. $\beta$ corresponding to $\alpha$ is calculated by the computer. Thus, the desirable position of the roll 5 at the line speed V is computed in terms of the shift angle $\beta$. This value is stored as converted to a corresponding value of an encoder ENC1. The value thus obtained by calculation indicates the position to which the roll 5 is to be controlled.

On the other hand, it is necessary to detect the current position of the roll 5, i.e. the current shift angle, using the encoder ENC1 and express the current value as a value of ENC1. The CPU reads the value from a signal output from the ENC1. The current value representing the current roll position and read by the CPU is compared with the above calculated value for control to obtain an output representing the difference between the values. The output is fed to a D/A conversion circuit D/A1 and converted to an analog signal, which is then fed to an amplifier AM1 and drives the d.c. servomotor DC1 to control the position of the roll 5.

The position of the feed angle adjusting roll 5 is controlled by the method described above. Subsequently, the position of the discharge angle adjusting roll 8 is controlled by the same method as is used for the position control of the feed angle adjusting roll 5, as will be apparent from the block diagram of FIG. 11. Accordingly, the method will not be described. In the present embodiment, however, the arms 45 for the roll 8 are supported by the shaft 3' of the heat roll 3', so that the angle $\alpha'$ about the center of the roll 3, i.e. the discharge angle $\alpha'$, through which the laminate film 7 is in contact with the heat roll 3 is equal to the angle $\beta'$ of shift of the arms 45, i.e. the roll 8, about the support point 3'. As in the foregoing case, the roll 8 is positioned at a shift angle $\beta'$ of 0 when the laminate film 7 is positioned at a discharge angle of 0.

FIG. 12 is a flow chart showing the foregoing process according to the present embodiment. The motor DC1 is coupled to the roll 5 by the arrangement of FIG. 7. The required amount of rotation of the motor DC1 is delivered to the encoder ENC1 via a V belt 38. When the motor over-rotates, the CPU controls the rotation properly based on the signal output from the encoder ENC1. The proper amount of rotation is delivered via a reduction gear G to the arms 23, 23, which in turn shift the roll 5 along a circular-arc path to the desired position. The motor DC2 is similarly coupled to the roll 8, which is therefore controlled in the same manner as above. In this way, the rolls 5, 8 are controlled each to the desired position in accordance with the line speed V. Typically used as the data for determining the position of the rolls 5, 8 in this embodiment is the feed angle which is equal to an angle $\alpha$ at the center of the heat roll 3 subtended by the area of contact of the film 1 with the roll 1, and the discharge angle which is equal to like angle $\alpha'$ relating to the laminate film, as already stated, and these items of data are keyed in the personal computer P. CPU.

The positions of the rolls 5, 8, which are dependent on the line speed and on the product numbers and thcknesses of the films 1, 2, will vary delicately owing to temperature and other factors. When such factors are entered in the personal computer P. CPU and recorded in the magnetic card C, the positions of the rolls 5, 8 are conveniently controllable as desired based on the recorded factors.

In the foregoing process, for controlling the rolls 5, 8, means other than the personal computer P. CPU is usable as desired for recording the predetermined data. Although the encoders ENC1 and ENC2 are used for accurately controlling the rolls according to the present embodiment, similar sensors, such as resolvers, or some other means may be used. When unnecessary, such means need not be used.

According to the present embodiment, the data recorded in a magnetic card by the personal computer is read by the computer system for the transfer of data, whereas the data may alternatively be fed directly to the CPU using, for example, digital switches or some other suitable mechanical switches. More specifically for example, the data to be set at actually measured values of line speeds 10, 20, 40, 80, 120, 160, 200 m/min shown in FIG. 9 may be set by mechanical switches and fed to the CPU. Thus, the rolls are controllable in the same manner as above according to the block diagram of FIG. 11 based on such a measurement read by the computer. This automatic adjusting method is also exemplary of the invention. In this case, the data is not recorded in a magnetic card but is directly set by the switch. Such data setting is included in the category of "recording," so that the mode of control described is of course included within the scope of the invention.

Although the peripheral speed of the heat roll 3 of the thermocompression bonding nipping roll unit has been referred to as the line speed in the above description of the embodiment, the line speed can of course be set with reference to the speed of any portion.

While the preferred embodiment of the invention and various modes thereof have been described above, the invention can be practiced in any other mode within the scope of the invention.

Next, the kinds of films useful for the process of the invention will be described.

According to the invention, films, sheets, etc. of any kind are usable insofar as they are bondable to one another by thermocompression, and such materials are herein referred to generally as films. Examples of such films are those made of polyolefins, polyamides, polyesters and other suitable thermoplastic resins. Preferably, the film 1 is one having a high melting point or high softening point, and the film 2 is one having a low melting point or low softening point. The use of such a film 1 reduces the likelihood of the film adhering to the heat roll 3 and is therefore desirable. It is more preferable to use as the film 1 a composite film 52 comprising a substrate film layer 50 which is to contact the heat roll 3 and a heat-sensitive adhesive resin layer 51 which has a higher melting point or softening point than the substrate film layer, and as the film 2 a film of the same resin as the layer 51 or of a resin of the same type as this layer. Alternatively, it is desirable that the film 2 be a suitable film which is thermally bondable to the heat-sensitive adhesive resin layer. It is desired that the film 2 be guided into contact with the pressure roll 4.

Examples of films 1 and 2 desirable for use in this invention will be further described. Useful films 1 are composite films 52 comprising a substrate film layer 50 and a heat-sensitive adhesive film layer 51. Examples of films useful for the substrate layer 50 are polypropylene films. Examples of more preferable films are those made of a propylene homopolymer at least 90% in boiling n-heptane extract residue content, or an ethylene-propylene random copolymer containing up to 5 mole % of ethylene and having a higher melting point than the heat-resistant adhesive film layer, or a mixture of propylene homopolymer and propylene-alpha-olefin copolymer containing propylene in a combined amount of at least 95 mole %.

On the other hand, examples of preferred resins for the heat-sensitive adhesive film layer 51 are ethylene polymers such as polyethylene, ethylene-1-butene random copolymer, ethylene-vinyl acetate copolymer and ionomer polymer, ethylene-propylene random copolymer, propylene-1-butene random copolymer, and a mixture of ethylene-propylene random copolymer and propylene-1-butene random copolymer. Other suitable resins are of course usable.

Examples of such ethylene-propylene random copolymers are those having a random property with an ethylene content of 0.5 to 15 mole %, preferably of 1 to 8 mole %. Examples of useful propylene-1-butene random copolymers are those having a random property with a propylene content of 50 to 99 mole %, preferably of 65 to 95 mole %. However, these values are not limited specifically. The heat-sensitive adhesive resin layer 51 may bear a suitable print formed thereon when so desired.

Examples of useful films 2 are those made of the same materials as exemplified above for the heat-sensitive adhesive resin layer 51. Nevertheless, the film 2 can of course be made of some other different material as already mentioned.

SPECIFIC EXAMPLE

A polyolefin film 2 easily heat-sealable and having an average thickness of 25μ and a length of 4000 m was prepared from the following composition by the T-die process using a 90-mm extruder.
Ethylene-propylene random copolymer: 100 parts
Propylene-1-butene random copolymer: 30 parts The die was set to a temperature of 270° C., and the chilled roll to 50° C. The film was rolled up at a speed of 30 m/min.

The ethylene-propylene radom copolymer was 4.5 mole % in ethylene content and 7.0 in M.I., while the propylene-1-butene random copolymer was 30 mole % in 1-butene content and 8.5 in M.I.

On the other hand, a film 1 was prepared by the following method. A polypropylene resin, 1.6 in M.I., was extruded from a T-die, and the extrudate was stretched lengthwise thereof 5 times to obtain a polypropylene film. An ethylene-propylene random copolymer, 4.5 mole % in ethylene content and 7.0 in M.I., was extruded in a molten state onto the film to form a heat-sensitive adhesive resin layer thereon to obtain a laminate, which was then stretched transversely thereof 8 times to prepare a biaxially stretched composite polypropylene film. The polypropylene layer formed was 17μ, and the heat-sensitive adhesive resin layer 3μ, in thickness. The composite film was cut to a width of 600 mm by a slitter, wound up on a paper tube and thereafter printed on the adhesive resin layer, giving a film 1 of 4000 m in length.

The films 1 and 2 thus obtained were made into a laminate film 7, about 4000 m in length, under the following conditions using the laminating apparatus shown in FIGS. 1 to 4.
Operation speed (peripheral speed of heat roll 3): 0→(gradually)→120→(gradually)→0 m/mm
Preheating temperature of film 1: 60° C., pressure 4 kg/cm
Preheating temperature of film 2: 60° C., pressure 4 kg/cm
Feed angle α: 0→(gradually)→57.3°→(gradually)→0°
Temperature of thermocompression bonding nipping roll: 120° C., pressure 30 kg/cm
Diameter of heat roll 3: 400 mm (metal roll mirror-finished by hard chromium plating over its surface and heated with steam)
Distance of contact of film 1 with heat roll 3: 0→(gradually)→20→(gradually)→0 cm
Diameter of pressure roll 4: 250 mm (silicone rubber roll)
Distance of contact of film 2 with pressure roll 4: about 10 cm
Temperature of film (2) feed portion of pressure roll 4: about 60° C.
Temperature of cooling roll 6: 25° C. (water-colled)
Discharge angle β': 0→(gradually)→85.9°→(gradually)→0°
Distance of contact of laminate film 7 with heat roll 7: about 0→(gradually)→30→(gradually)→0 cm
Temperature of discharge angle adjusting roll: about 30° C. (water-cooled)
Temperature of cooling roll 35: 20° C., pressure 4 kg/cm (water-cooled)

During the above operation, the feed angle adjusting roll 5 and the discharge angle adjusting roll 8 were each automatically adjusted to the proper position by the computer-controlled process shown in FIGS. 5 to 7 and FIGS. 9 to 12. The distance of contact of the film 1 or the laminate film 7 with the heat roll 3 which is 0 cm refers to the position of the contact point at the nip. The distance of contact means the distance from this position over which the film is in contact with the heat roll surface. The slight depression at the surface of the pressure roll 4 due to the applied pressure is neglected to consider the distance ideally, as in the foregoing description of the invention.

The laminate film thus obtained was free of creasing or clouding, uniform and sufficient in bond strength over the entire area of the product and had the desirable quality since the film was subjected to a substantially constant amount of heat at all times during the entire operation started at a low speed, continued at a steady-state speed of 120 m/min and terminated after a speed reduction.

INDUSTRIAL APPLICATION

Briefly stated, the process and apparatus of the present invention are useful for laminating a film to a film by thermocompression bonding, and are especially suited to such operation when one of the films is a composite film comprising a substrate film layer and a heat-sensitive adhesive resin layer.

We claim:

1. A process for thermocompression bonding lamination of a first film to a second film using a nipping roll unit having a heat roll and a pressure roll, comprising the steps of: subjecting the films to thermocompression bonding by guiding the first film onto the heat roll while guiding the second film onto the pressure roll to obtain a laminate film, and subsequently, releasing the laminate film over a discharge angle adjusting roll for automatically adjusting the distance of contact of the laminate film with the heat roll in accordance with the line speed.

2. A thermocompression bonding lamination process as defined in claim 1, wherein said releasing step comprises the further steps of recording predetermined positions of the discharge angle adjusting roll at varying line speeds, reading data as to the recorded position at the particular line speed of thermocompression bonding, and automatically adjusting the position of the discharge angle adjusting roll according to the data read.

3. A thermocompression bonding lamination process as defined in claim 2, wherein the line speed that the distance of contact of the laminate film is adjusted in accordance with is the peripheral speed of the heat roll.

4. A thermocompression bonding lamination process as defined in claim 1, wherein the step of guiding the first film onto the heat roll is performed via a feed angle adjusting roll for automatically adjusting the distance of contact of the film with the heat roll.

5. A thermocompression bonding lamination process as defined in claim 2, wherein the step of guiding the first film onto the heat roll is performed via a feed angle adjusting roll for automatically adjusting the distance of contact of the film with the heat roll.

6. A thermocompression bonding lamination process as defined in claim 3, wherein the step of guiding the first film onto the heat roll is performed via a feed angle adjusting roll for automatically adjusting the distance of contact of the film with the heat roll.

7. A thermocompression bonding lamination process as defined in claim 4, wherein the step of guiding the first film comprises the further steps of recording predetermined positions of the feed angle adjusting roll at varying line speeds, reading data as to the recorded position at the particular line speed of thermocompression bonding, and automatically adjusting the position of the feed angle adjusting roll according to the data read.

8. A thermocompression bonding lamination process as defined in claim 5, wherein the step of guiding the first film comprises the further steps of recording predetermined positions of the feed angle adjusting roll at varying line speeds, reading data as to the recorded position at the particular line speed of thermocompression bonding, and automatically adjusting the position of the feed angle adjusting roll according to the data read.

9. A thermocompression bonding lamination process as defined in claim 6, wherein the step of guiding the first film comprises the further steps of recording predetermined positioned of the feed angle adjusting roll at varying line speeds, reading data as to the recorded position at the particular line speed of thermocompression bonding, and automatically adjusting the position of the feed angle adjusting roll according to the data read.

10. A thermocompression bonding lamination process as defined in claim 1, wherein the first film is a composite film comprising a substrate film layer and a heat-sensitive adhesive resin layer, and wherein the substrate film layer of the composite film is brought into contact with the heat roll during the guiding step.

11. A thermocompression bonding lamination process as defined in claim 4, wherein the first film is a composite film comprising a substrate film layer and a heat-sensitive adhesive resin layer, and wherein the substrate film layer of the composite film is brought into contact with the heat roll during the guiding step.

12. A thermocompression bonding lamination process for bonding a first film to a second film using a nipping roll unit having a heat roll and a pressure roll, comprising the steps of subjecting the films to thermocompression bonding by guiding the first film onto the heat roll via a feed angle adjusting roll for automatically adjusting the distance of contact of the first film with the heat roll in accordance with the line speed while guiding the second film onto the pressure roll, and releasing the resulting laminate film from the heat roll, wherein the step of guiding the first film comprises the steps of recording predetermined positions of the feed angle adjusting roll at varying line speeds, reading data as to the recorded position at the particular line speed of thermocompression bonding, and automatically adjusting the position of the feed angle adjusting roll according to the data read.

13. A thermocompression bonding lamination process as defined in claim 12, wherein the line speed that the distance of contact of the first film is adjusted in accordance with is the peripheral speed of the heat roll.

14. A thermocompression bonding lamination process as defined in claim 12, wherein the first film is a composite film comprising a substrate film layer and a heat-sensitive adhesive resin layer, and wherein the substrate film layer of the composite film is brought into contact with the heat roll during the guiding step.

15. A thermocompression bonding lamination apparatus for laminating a first film and a second film into a laminate film by thermocompression bonding comprising a nipping roll unit having a heat roll and a pressure roll, and a discharge angle adjusting roll for automatically adjusting the distance of contact of the laminate film with the heat roll in accordance with the line speed when the laminate film is released from the heat roll.

16. A thermocompression bonding lamination apparatus as defined in claim 15, further comprising a feed angle adjusting roll for automatically adjusting the distance of contact of the first film with the heat roll in accordance with the line speed when the first film is guided onto the heat roll.

17. A thermocompression bonding lamination apparatus as defined in claim 16, comprising data recording and storage means for recording predetermined positions of the feed angle adjusting roll at varying line speeds, data reading means for reading data as to the recorded position at the particular line speed of thermocompression bonding from said data recording and storage means, and means for automatically adjusting the position of the feed angle adjusting roll in accordance with the data read by said reading means.

18. A thermocompression bonding lamination apparatus as defined in claim 17, comprising data recording and storage means for recording predetermined positions of the discharge angle adjusting roll at varying line speeds, data reading means for reading data as to the recorded position at the particular line speed of thermocompression bonding from said data recording and storage means, and means for automatically adjusting the position of the feed angle adjusting roll in accordance with the data read by said reading means.

* * * * *